United States Patent
Abel et al.

(10) Patent No.: US 8,681,363 B2
(45) Date of Patent: Mar. 25, 2014

(54) RASTER APPLICATION INSTANCES

(75) Inventors: Donald Abel, Sherwood, OR (US); Tasha Tasavida Zahnd, Vancouver, WA (US); Paul Wissenbach, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 67 days.

(21) Appl. No.: 13/362,516

(22) Filed: Jan. 31, 2012

(65) Prior Publication Data

US 2013/0194616 A1 Aug. 1, 2013

(51) Int. Cl.
*G06F 15/00* (2006.01)

(52) U.S. Cl.
USPC .......................................... 358/1.15

(58) Field of Classification Search
USPC .......................................... 358/1.15
See application file for complete search history.

(56) References Cited

U.S. PATENT DOCUMENTS

| | | | |
|---|---|---|---|
| 6,680,782 | B1 | 1/2004 | Jamzadeh |
| 6,985,245 | B1 | 1/2006 | Takahashi |
| 7,327,487 | B2 | 2/2008 | Prosi |
| 7,576,878 | B2 | 8/2009 | Christiansen et al. |
| 7,576,880 | B2 | 8/2009 | Christiansen et al. |
| 7,586,500 | B2 | 9/2009 | Herceg et al. |
| 8,059,129 | B2 | 11/2011 | Sullivan et al. |
| 8,233,185 | B2 * | 7/2012 | Gordon et al. ............... 358/1.18 |
| 2005/0094191 | A1 * | 5/2005 | Vondran et al. ............... 358/1.15 |
| 2009/0033986 | A1 | 2/2009 | Himpe |

FOREIGN PATENT DOCUMENTS

| | | |
|---|---|---|
| EP | 1906340 A2 | 1/2008 |
| JP | 2009214348 A | 9/2009 |

* cited by examiner

*Primary Examiner* — Saeid Ebrahimi Dehkordy
(74) *Attorney, Agent, or Firm* — Garry A. Perry

(57) ABSTRACT

In one embodiment, data indicative of a measurement of resource utilization at a computer during a rasterization event is received. The data is compared to a database associating resource utilizations with commands to increment or decrement raster application instances executing in the event. Responsive to determining the data is associated with a command to increment or decrement an instance in the event, a first instance is incremented or decremented according to the command.

20 Claims, 7 Drawing Sheets

| Optimization Associations Database ||
| Percent CPU Utilization | RIP Application Instance Command |
| --- | --- |
| >= 99 | Decrement – 1 |
| 95 < x < 99 | No Change |
| <= 95 | Increment + 1 |

FIG. 2

RASTER APPLICATION INSTANCES

BACKGROUND

Raster image processing (RIP) is a process of translating digital instructions as to how a print job is to be printed to create raster bits, also known as a bitmap. The digital instructions may be expressed in a number of various languages and formats, including but not limited to HPGL/2 (Hewlett-Packard Graphics Language 2), PostScript, PDF (Portable Document Format), JPEG (Joint Photographic Experts Group standard), TIFF (Tagged Image File Format), PCL3 (Printer Command Language 3) and PCL 6 (Printer Command Language 6). In some situations, the instructions can be in the form of a bitmap of higher or lower resolution than is optimal for a particular print engine. The bitmap that is the output of a RIP event can be sent to a print engine, which will interpret the bitmap to determine where and how to deposit an ink, toner, or another marking agent upon a media to form an image.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

FIG. 2 is an example of an associations database, according to various embodiments.

The same part numbers designate the same or similar parts throughout the figures.

DETAILED DESCRIPTION OF EMBODIMENTS

Figure 1:
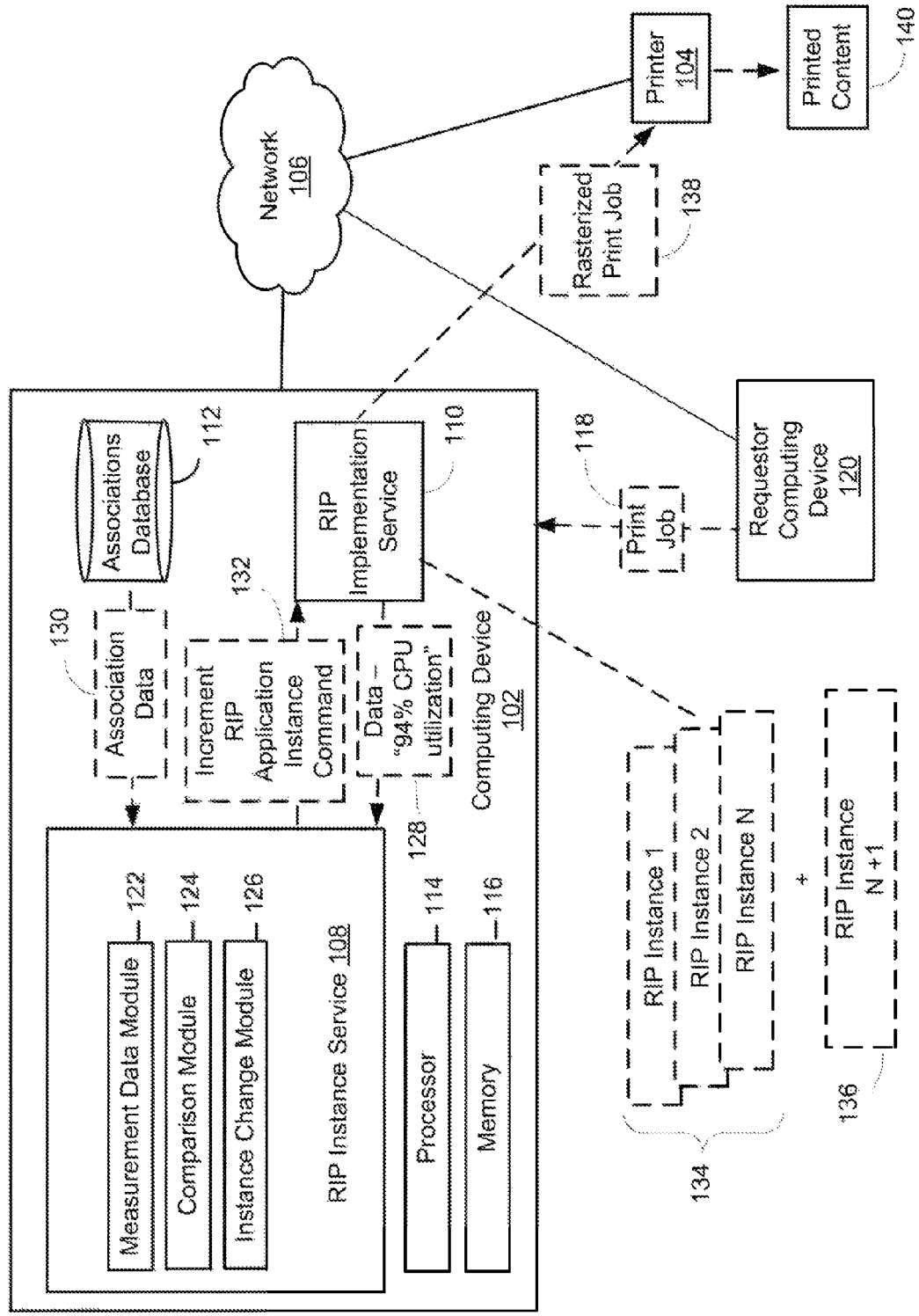
FIG. 1 is a block diagram illustrating a system according to various embodiments.

Large print jobs, as well as complex print jobs, can be substantially time consuming to RIP, even for a large commercial-size printer. This is because the RIP process typically includes some combination of image decompression, color space conversion, half-toning, formatting, and compression operations to convert the digital instructions to the device-ready bitmaps. A time consuming RIP operation can be a costly undertaking for an enterprise, as it could cause one or more users substantial time delays as they wait for a print job to be RIPed.

In order to increase the speed of RIPing at a RIP resource, it is possible to configure a RIP resource to execute a particular number or quantity of RIP application instances at once. In an example, when RIPing a large or complex print job it may be advantageous to split the job into pieces and have the pieces concurrently processed by different instances of the RIP application. In this scenario, the time to complete RIP of the print job will be a function not only of the size of the print job, but also the total amount of RIP application instances resources that are available at that time, other tasks being performed by the processor that executes the RIP application instances, and other criteria.

Determining an optimal or most acceptable fixed number or quantity of RIP instances to execute at the RIP resource can be a time consuming and laborious process and substantially impede print facility throughput. For example, it may be necessary for RIP resources and print engines to sit idle while a human being or computing devices attempts to determine the optimal fixed number of RIP instances in light of the addition of a new or unfamiliar computer printer or other component, or the introduction of a new or unfamiliar condition to the RIP environment.

Further, an attempt to determine a fixed most acceptable or optimal number of RIP instances to run concurrently at a RIP resource can easily result in user dissatisfaction. Selecting a fixed number of RIP instances applicable to all situations involves tradeoffs between over and under utilization for different job types and for different operating circumstances. For example, while a fixed number of application instances that is selected may be most acceptable or optimal in certain situations, in other situations that same fixed number of application instances will be suboptimal as available computer resources are not fully utilized. And yet in other situations, execution of that same fixed number of application instances may tax available computer resources to the point that the RIP operation and printing are caused to be performed more slowly, rather than more quickly.

Accordingly, various embodiments described herein were developed to provide a system, a method, and a computer-readable storage medium containing instructions, to enable dynamic varying of RIP application instances executing at a computer. According to various embodiments, data indicative of a measurement of resource utilization at a computer during a rasterization event is received. The data is compared to a database associating resource utilizations with commands to increment or decrement raster application instances executing in the event. Responsive to determining the data is associated with a command to increment or decrement an instance in the event, a first instance is incremented or decremented according to the command.

In certain embodiments, the measurement of resource utilization is a measurement of processor utilization, a measurement of memory utilization, a measurement of multithread utilization, or a measurement of network bandwidth utilization. In certain embodiments, the database includes a trigger utilization level associated with a command to increment an instance to the event, and a ceiling utilization level associated with a command to decrement an instance from the event. In certain embodiments, the raster application instances that can be incremented or decremented are dynamic application instances, and a number or quantity of static raster application instances execute at the computer concurrent with the dynamic application instances during RIP event.

Advantages of the disclosure include the enablement of dynamic determination a number of RIP application instances to execute at a computing device according to a measurement of system resources. The determination can take place automatically without requiring system resources to sit idle during the determination process. Further, the disclosure enables the determination to be easily updated to accommodate changes to the operating environment or changes. A most acceptable or optimal number of number of RIP instances to run concurrently at a RIP resource can be determined and updated consistently to optimize utilization of a processor in light of different job types and/or different operating circumstances. User satisfaction with the RIPing will increase as RIP performance and printing performance increases, as RIP speeds and printing speeds decrease.

As used in this application, a "rasterization event" refers to a rasterization task to be performed and is used synonymously with a "RIP event." In examples, rasterization events may involve RIPing of a particular print job, or of multiple print jobs. Similarly, "rasterize" is used synonymously with "RIP", and "rasterized" is used synonymously with "RIPed." A "RIP application" refers to an application, software, firmware, and/or programming that when executed performs a RIP event. A "raster application instance" refers to an occurrence or incidence of a raster application. A "dynamic raster application instance" refers to a raster application instance that can be incremented or decremented according to resource utilization at a computer. A "static raster application instance" refers to a raster application instance that is executed throughout a raster event and is not incremented or decremented according to resource utilization at a computer. A "measurement of resource utilization" at a computer refers to a measurement of an attribute of a physical or virtual component or functionality within a computer or computer system. A "trigger utilization level" refers to a level of computer resource utilization that triggers an incrementing of a RIP application instance. A "ceiling utilization level" refers to a level of computer resource utilization that triggers a decrementing of a raster application instance. "Multi-threading" refers to a processor executing several threads of programming (e.g., threads of a one computer program, or threads of more than one computer program) at the same time or apparently at the same time. In an example, a program may have multiple parts that run at the same time. For instance, a processor executing multithreaded code may concurrently execute a background task responsive to mouse input, load a file into RAM, and update a progress bar to display on a display device. In another example, the processor may run a thread of code for perhaps a few hundred microseconds then switch to another thread of code and run it for a short while and so on. As used herein, a "printer" or "printing device" refers to any liquid inkjet printer, toner-based printer, sold ink printer, or any other electronic device that prints." "Printer" or "printing device" includes any multifunctional electronic device that performs a function such as scanning and/or copying in addition to printing. "Ink" refers to any fluid used for printing including but not limited to aqueous inks, solvent inks, UV-curable inks, dye sublimation inks and latex inks. "Print engine" refers to electronic circuitry controlling a printer's mechanical printing hardware. "Print job" refers to instructions and/or content for printing that can be stored in a programming language and/or numerical form so that it can stored and used in computing devices, servers, printers and other machines capable of performing calculations and manipulating data. A print job may include one or more plots. "Plot" is used synonymously with an "image", and refers to a representation or rendering of an object, scene, person, or an abstraction such text or a geometric shape.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 1 shows a computing device 102 electronically connected to a printer 104 via a network 106. Computing device 102 represents generally any computing device or group of computing devices configured to send and receive network requests, send and receive print jobs or other content, and otherwise communicate with printer 104 and a requestor computing device 120. In embodiments, computing device 102 may be or include a server, desktop computer, notebook computer, mobile device, tablet computer, and/or any other computing device. Printer 104 represents generally a computing device that is operable to produce a printed print job or printed content, and additionally operable to send network requests, print jobs and other content to, receive network requests, print jobs, and other content from, and otherwise communicate with computing device 102 over network 106.

Network 106 represents generally hardware components and computers interconnected by communications channels that allow sharing of resources and information. Network 106 may include a cable, wireless, fiber optic, or remote connection via a telecommunication link, an infrared link, a radio frequency link, or some combination of these, or any other connectors or systems that provide electronic communication. Network 106 may include, at least in part, an intranet, the internet, or a combination of both. Network 106 may also include intermediate proxies, routers, switches, load balancers, and the like. The paths followed by network 106 between computing device 102, printer 104, and requestor computing device 120 as depicted in FIG. 1 represent the logical communication paths between these devices, not necessarily the physical paths between the devices.

Computing device 102 is shown to include RIP instance service 108, RIP implementation service 110, associations database 112, processor 114, and memory 116. RIP instance service 108 represents generally any combination of hardware and programming configured to cause varying of RIP application instances executing at computing device 102 in accordance with measurements of resource utilization at the computing device. RIP implementation service 110 represents generally any combination of hardware and programming configured to implement RIP of a print job or other content at computing device 102. More specifically RIP implementation service 110 includes RIP application programming that when executed by processor 114 performs a RIP event. RIP implementation service 110 is configured to enable multiple instances of the RIP application programming to be executed concurrently by processor 114. RIP implementation service 110 receives print jobs via network 106, and may adjusts the number of raster application instances according to increment or decrement instructions received from RIP instance service 108. Processor 114 represents generally any instruction execution system, such as a computer/processor based system or an ASIC (Application Specific Integrated Circuit), a computer, or other system that can fetch or obtain instructions or logic stored in memory 116 and execute the instructions or logic contained therein. Memory 116 represents generally any memory configured to store program instructions and other data.

In the example of FIG. 1, RIP implementation service 110 receives print job 118 from requestor computing device 120 via network 106. RIP implementation service 110 begins RIPing of the print job utilizing N instances 134 of a RIP application. Examples of RIP applications include, but are not limited to commercial applications, software, firmware, and/or programming that performs raster image processing for content in standard document formats such as image file types PNG, JPEG, and GIF, or in page description language formats such as PostScript, PDF, and PCL. In other examples, a RIP application may be a custom application, software, firmware, and/or programming that performs raster image processing for content in standard or custom formats.

RIP instance service 108 includes a measurement data module 122, comparison module 124, and instance change module 126. Measurement data module 122 receives from the RIP implementation service 110 data 128 indicative of a measurement of resource utilization at a computer during a rasterization event. In this example, the measurement is a measurement of utilization of processor 114 expressed in terms of percent CPU utilization and data 128 indicates that during a raster event processor 114 is being utilized at 94% of processor 114's available processing capability. In another embodiment, the measurement and data 128 may be expressed as a ratio of utilized memory relative to available memory at processor 114 expressed in a form other than as a percentage. In another embodiment, the measurement and data 128 may be expressed as a percentage or other ratio of free processing capability relative to available processing capability, at processor 114 relative to available processing capability. As used in this application, "utilized" processing capability refers to processing capability of a processor that is being currently utilized. "Free" processing capability refers to processing capability of a processor that is not being currently utilized. "Available" processing capability refers to the total processing capability of a processor. When the utilized processing capability and free processing capability are expressed as percentages relative to available processing capability, the relationship can be expressed according to the following equation:

utilized processing capability+free processing capability=available processing capability.

In certain other embodiments, the measurement of resource utilization can be a measurement of memory utilization, a measurement of multithread utilization, and/or a measurement of network bandwidth utilization. In examples, the measurement may be a ratio of free memory relative to available memory, or a ratio of utilized memory relative to available memory. In another example, the measurement may be a ratio of free threads relative to available threads, or a ratio of utilized threads relative to available threads. In other examples, the measurement may be a ratio of free network bandwidth relative to available network bandwidth, or a ratio of utilized network bandwidth relative to available network bandwidth.

Comparison module 124 compares received utilization data 128 to an associations database 112. Moving to FIG. 2, in this example associations database 112 is a lookup table stored in memory 116 (FIG. 1) or at other memory at computing device 102 (FIG. 1). Associations database 112 associates certain CPU resource utilizations with commands to increment or decrement raster application instances executing at RIP implementation service 110 during a RIP event. In this example, associations database 112 includes a trigger utilization level 202 of "<=95" percent associated with a "Increment+1" command 204 to be sent to RIP implementation service 110 to cause the service 110 to increment one RIP application instance during a RIP event. In this example, associations database 112 also includes a ceiling utilization level 206 of ">=99" percent associated with a "Decrement−1" command 208 to be sent to RIP implementation service 110 to cause the service 110 to decrement one RIP application instance during a RIP event. In this example, associations database 112 also includes a plateau utilization level or range 210 of "95<x<99" associated with a determination to not send an "increment+1" command or a "decrement−1" command to RIP implementation service 110. When the utilization measurement is at the plateau utilization level, the number of RIP application instances executing at computing system 102 during the RIP event is not changed.

Returning to FIG. 1, instance change module 126, responsive to determining the received utilization measurement data 128 is associated with a command to increment or decrement an instance in the event, causes incrementing or decrementing of a raster application instance according to the command. In this example, the instance change module 126 makes the determination based upon the association data 130 obtained from associations database 112. Continuing with the example of FIG. 1, utilization measurement data 128 indicates a "94% CPU utilization" measurement, and it is determined via the associations database 112 that the 94% measurement is associated with a RIP application instance command to "increment+1" instance. Responsive to such determination, instance change module 126 sends an "increment RIP application instance" command 132 to RIP implementation service 110 to increment a raster application instance ("RIP Instance N+1" 136) during the RIP event. In this manner, a dynamic determination of an optimal number of RIP application instances is made according to a measurement of system resources, and the RIP event executing at computing device 102 is adjusted to the determined optimal number. Rasterization of the print job 118 occurs utilizing the incremented instance 136. Following RIPing of the print job 118 at RIP implementation service 110, the rasterized print job 138 is sent to printer 104 via network 106. Printer 104 utilizes the bitmap instructions contained within the rasterized print job 138 to create printed output 140.

In other embodiments, the associations database may be a form or type of organized data other than a lookup table. Further, in certain embodiments, the associations database may be located at a computing device, e.g., a server device, external to computing device 102 and accessible to computing device 102 via network 106.

The functions and operations described with respect to RIP instance service 108 and computing device 102 may be implemented as a computer-readable storage medium containing instructions executed by a processor (e.g., processor 114) and stored in a memory (e.g., memory 116).

Figure 3:
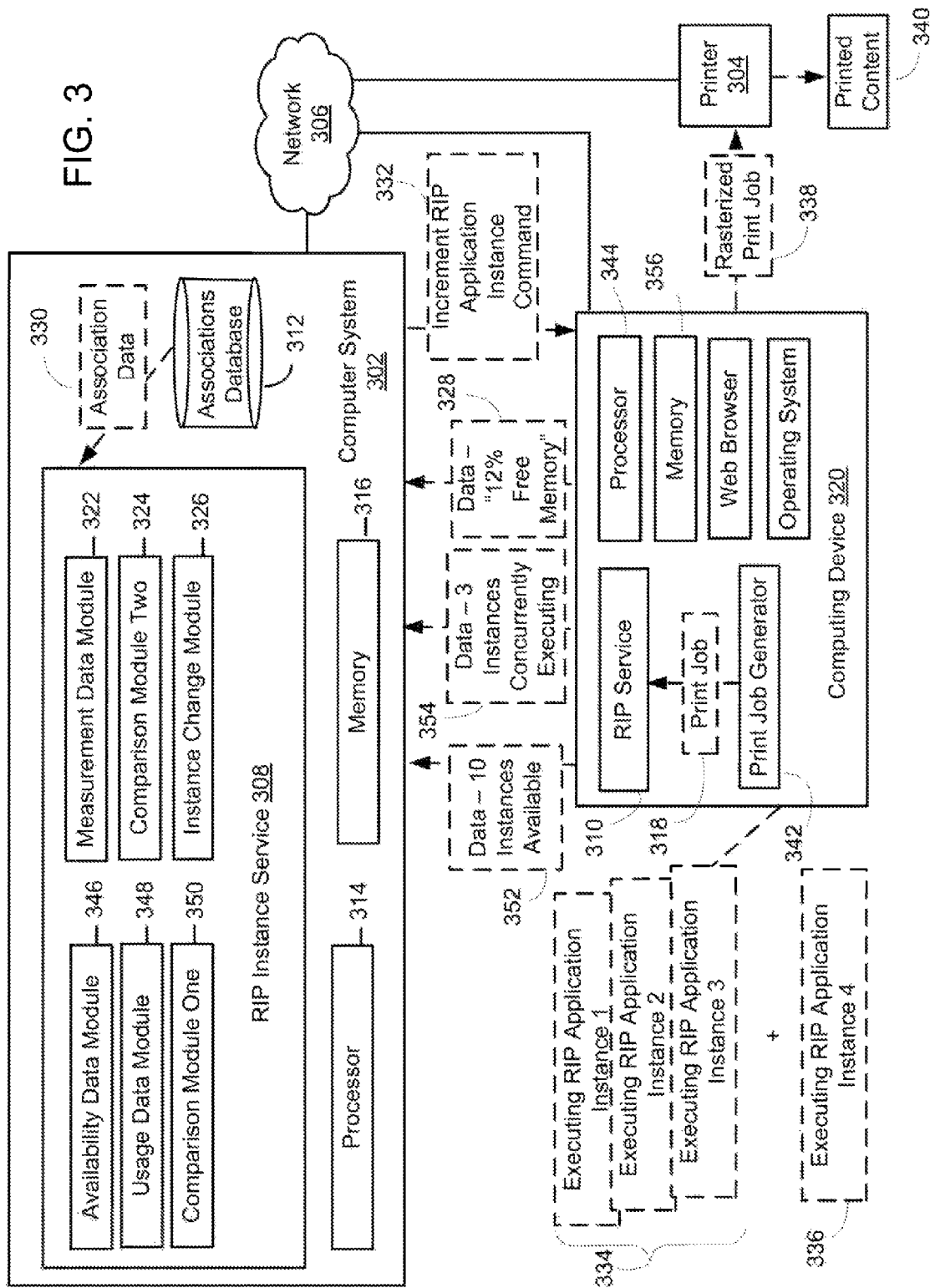
FIG. 3 is a block diagram illustrating a system according to various embodiments.

FIG. 3 is a block diagram illustrating a system according to various embodiments. FIG. 3 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 3 shows a computer system 302 electronically connected to a printer 304 and a computing device 320 via a network 306. Computer system 302 represents generally any computing device or group of computing devices configured to send and receive network requests, send and receive print jobs or other content, and otherwise communicate with computing device 320. In embodiments, computer system 302 may be or include a server, desktop computer, notebook computer, mobile device, tablet computer, and/or any other computing device. Computing device 320 represents generally any computing device or group of computing devices configured to send and receive network requests, send and receive print jobs or other content, and otherwise communicate with computer system 302 and printer 304. Printer 304 represents generally a computing device that is operable to produce printed print jobs or other content, and additionally operable to send network requests, print jobs and other content to, receive network requests, print jobs, and other content from, and otherwise communicate with computing device 320 over network 306.

Network 306 represents generally hardware components and computers interconnected by communications channels that allow sharing of resources and information. Network 306 may include a cable, wireless, fiber optic, or remote connection via a telecommunication link, an infrared link, a radio frequency link, or some combination of these, or any other connectors or systems that provide electronic communication. Network 306 may include, at least in part, an intranet, the internet, or a combination of both. Network 306 may also include intermediate proxies, routers, switches, load balancers, and the like. The paths followed by network 306 between computer system 302, printer 304, and computing device 320 as depicted in FIG. 3 represent the logical communication paths between these devices, not necessarily the physical paths between the devices.

Computer system 302 is shown to include RIP instance service 308, associations database 312, processor 314, and memory 316. RIP instance service 308 represents generally any combination of hardware and programming configured to cause varying of RIP application instances executing at the raster image processing service executing at computing device 320, in accordance with measurements of computer or network resource utilization at computing device 320.

RIP service 310 at computing device 320 represents generally any combination of hardware and programming configured to implement RIP of a print job or other content. More specifically RIP service 310 includes RIP application programming that when executed by a processor 344 performs a RIP event. RIP service 310 is configured to enable multiple instances of the RIP application programming to be executed concurrently by processor 344.

RIP service 310 receives a print job 318 from a print job generator 342 at computing device 320. In an example, print job generator 342 may send print job 318 to RIP service 310 as a result of a user of computing device 320 identifying web content that he or she wants to print. The user may communicate a command to print the identified web content via a "print" instruction given at computing device 320 via a keyboard, mouse, or other user interface. When executing the RIP event in connection print job 318, RIP service 310 will adjust the quantity of raster application instances utilized in a RIP event according to increment or decrement instructions received from RIP instance service 308 at computer system 302. RIP service 310 begins RIPing of the print job utilizing three instances ("Executing RIP Application Instances 1, 2 and 3") 334 of a RIP application.

RIP instance service 308 at computer system 302 includes availability data module 346, usage data module 348, comparison module one 350, measurement data module 322, comparison module two 324, and instance change module 326. Computing device 320 sends to computer system 320, and availability data module 346 receives, instance availability data 352 indicative that there are ten raster application instances available 19 to be executed concurrently at computing device 320 during a RIP event. Computing device 320 sends to computer system 320, and usage data module 348 receives, second data 354 indicating that there are three RIP application instances 334 concurrently executing at computing device 320 during the RIP event. Comparison module one 350 at computer system 302, prior to incrementing a RIP instance, compares the first 352 and second data 354 to determine that quantity of instances available (ten) is greater than the quantity of instances concurrently executing (three).

Measurement data module 322 receives from the RIP service 310 utilization data indicative of a measurement of resource utilization at computing device 320 during the rasterization event. In this example, the measurement is a measurement of utilization of memory 356 expressed in terms of free memory at memory 356 and data 328 indicates that during the raster event memory 356 has 12% free memory. In another embodiment, the free memory measurement and utilization data 328 may be expressed as a ratio expressed in a form other than as a percentage. In another embodiment, the measurement and data 328 may be expressed as a percentage or other ratio of utilized memory relative to available storage at processor 356. As used in this application, "utilized" memory refers to memory that is being currently utilized. "Free" memory refers to memory that is not being currently utilized. "Available" memory refers to the total memory. In an embodiment, when the utilized memory and free memory are expressed as percentages relative to available memory, the relationship can be expressed according to the following equation:

utilized memory+free memory=available memory.

Figure 4:
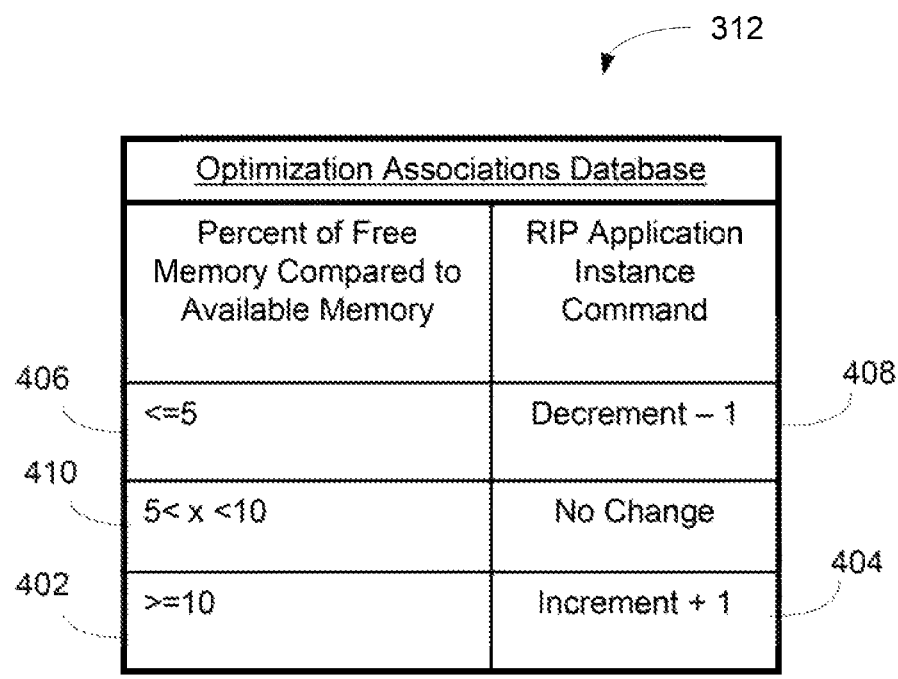
FIG. 4 is an example of an associations database, according to various embodiments.

Comparison module two 324 at computer system 302 compares received utilization data 328 to an associations database 312. Moving to FIG. 4, in this example associations database 312 is stored in memory 316 (FIG. 3) or at other memory at computer system 302 (FIG. 3). In other embodiments, the associations database may be located external to computer system 302 and accessible via network 306. Associations database 312 associates certain memory resource utilizations with commands to increment or decrement raster application instances executing at RIP service 310 during a RIP event. In this example, associations database 312 includes a trigger utilization level 402 of ">=10" percent free memory associated with a "Increment+1" command 404 to be sent to RIP service 310. Sending of the "Increment+1" command 404 to RIP service 310 would cause the service 310 to increment one RIP application instance during a RIP event. In this example, associations database 312 also includes a ceiling utilization level 406 of "<=5" percent associated with a "Decrement−1" command 408 to be sent to RIP service 310. Sending of the "Decrement−1" command 406 to RIP service 310 would to cause the service 310 to decrement one RIP application instance during a RIP event. In this example, associations database 312 also includes a plateau utilization level or range 410 of "5<x<10" percent free memory associated with a determination to not send an "increment+1" command or a "decrement−1" command to RIP service 310. When the utilization measurement is at the plateau utilization-level, the quantity of RIP application instances executing at computing system 302 during the RIP event is not changed.

Returning to FIG. 3, instance change module 326, responsive to determining the received utilization measurement data 328 is associated with a command to increment or decrement an instance in the event, causes incrementing or decrementing of a raster application instance according to the command. In this example, the instance change module 326 makes the determination based upon association data 330 obtained from associations database 312. Continuing with the example of FIG. 3, utilization measurement data 328 indicates a "12% free memory" measurement, and it is determined via the associations database 312 that the 12% free memory measurement is associated with a RIP application instance command to "increment+1" instance. Responsive to such determination, instance change module 326 sends an "increment RIP application instance" command 332 to RIP service 310 to increment a raster application instance ("Executing RIP Application Instance 4" 336) at RIP service 310 during the RIP event. Rasterization of the print job 118 occurs utilizing the incremented instance 336. Following RIPing of the print job 318 at RIP service 310, the rasterized print job 338 is sent to printer 304 via network 306. Printer 304 utilizes the bitmap instructions contained within the rasterized print job 338 to create printed output 340.

The functions and operations described with respect to RIP instance service 308 and computer system 302 may be implemented as a computer-readable storage medium containing instructions executed by a processor (e.g., processor 314) and stored in a memory (e.g., memory 316). In a given implementation, processor 314 may represent multiple processors, and memory 316 may represent multiple memories. Processor 314 represents generally any instruction execution system, such as a computer/processor based system or an ASIC (Application Specific Integrated Circuit), a computer, or other system that can fetch or obtain instructions or logic stored in memory 316 and execute the instructions or logic contained therein. Memory 316 represents generally any memory configured to store program instructions and other data.

Figure 5:
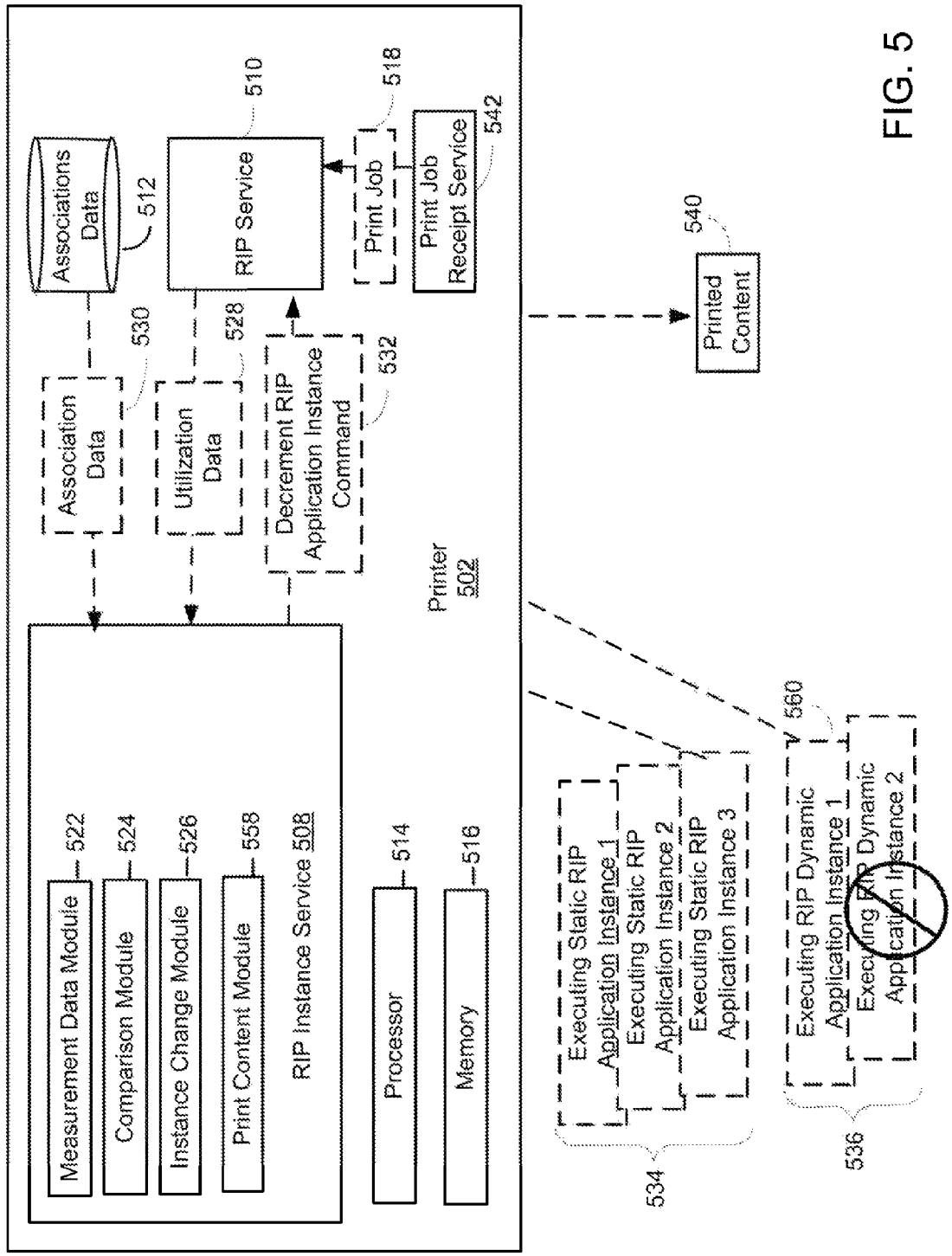
FIG. 5 is a block diagram illustrating a system according to various embodiments.

FIG. 5 is a block diagram illustrating a system according to various embodiments. FIG. 5 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 5 shows a printer 502, representing generally any computing device or group of computing devices configured to operable to produce printed print jobs or other content. In embodiments, printer 502 may be additionally operable to send and receive network requests, send and receive print jobs, and otherwise communicate with other computer systems via a link and/or over a network. Printer 502 is shown to include a RIP service 510, RIP instance service 508, associations database 512, processor 514, and memory 516. RIP service 510 at computing device 520 represents generally any combination of hardware and programming configured to implement RIP of a print job or other content. RIP service 510 includes RIP application programming that when executed by processor 514 performs a RIP event. RIP service 510 is configured to enable multiple instances of the RIP application programming to be executed concurrently by processor 514.

In the example of FIG. 5, RIP service 510 receives a print job 518 from a print job receipt service 542. In an example, RIP service 510 may receive print job 518 from print job receipt service 542 as a result of a user of printer 502 communicating a command to print the identified web content via a "print" instruction given at printer 502 via a touchpad other user interface. In another example, print job 518 may be received at print job receipt service 542 from a host computing device that is connected linked to printer 502 via a link or network. RIP service 510 begins RIPing of the print job utilizing three instances 534 of a RIP application.

In the example of FIG. 5, RIP service 510 executes three static raster application instances ("Executing Static RIP Application Instances 1, 2 and 3") 534 of a same RIP application during RIP events. At the beginning of the RIP event to rasterize print job 518, RIP service 510 also executes two dynamic raster application instances ("Executing Dynamic RIP Application Instances 1 and 2") 536 of the same RIP application.

RIP instance service 508 represents generally any combination of hardware and programming configured to cause varying of dynamic RIP application instances executing at the raster image processing service executing at computing device 520, The varying of dynamic RIP instances is determined in accordance with measurements of resource utilization at computing device 520. RIP instance service 508 includes measurement data module 522, comparison module two 524, instance change module 526, and print content module 558.

RIP service 510 sends to RIP instance service 508, and measurement data module 522 receives, utilization data indicative of a measurement of resource utilization at computing device 520 during the rasterization event. In examples, the measurement may be a measurement of utilization of processor 514, utilization of memory 516, utilization of network bandwidth, thread utilization among a multithread queue, or any other computing resource applicable to printer 502.

Comparison module 524 at printer 502 compares the received utilization data 528 to an associations database 512 included within printer 502. In another embodiment, the associations database may be located external to printer 502 and accessible via network 506. Associations database 512 associates certain memory resource utilizations with commands to increment or decrement dynamic raster application instances executing at RIP service 510 during a RIP event.

Instance change module 526, responsive to determining the received utilization measurement data 528 is associated with a command to increment or decrement a dynamic RIP application instance in the event, causes incrementing or decrementing of a dynamic raster application instance according the associated command. In an example, the instance change module 526 may make a determination to decrement a dynamic RIP application instance based upon association data 530 obtained from associations database 512 indicating that a computer resource is, or is likely to become, excessively taxed or overloaded.

Responsive to such determination, instance change module 526 sends an "decrement RIP application instance" command 532 to RIP service 510 to decrement a dynamic raster application instance ("Executing RIP Dynamic Application Instance 2" 536) at RIP service 510 during the RIP event. After the decrement adjustment, the print job is RIPed at RIP service 510 utilizing concurrently the three static RIP application instances and the one dynamic RIP application instance 560 that has been determined to be an optimal number of dynamic instances. Following the RIPing of the print job 518, print content module 558 causes the print job to be printed utilizing the bitmap instructions contained within the rasterized print job to create printed output 540.

The functions and operations described with respect to RIP instance service 508 and printer 502 may be implemented as a computer-readable storage medium containing instructions executed by a processor (e.g., processor 514) and stored in a memory (e.g., memory 516). In a given implementation, processor 514 may represent multiple processors, and memory 516 may represent multiple memories. Processor 514 represents generally any instruction execution system, such as a computer/processor based system or an ASIC (Application Specific Integrated Circuit), a computer, or other system that can fetch or obtain instructions or logic stored in memory 516 and execute the instructions or logic contained therein.

Memory 516 represents generally any memory configured to store program instructions and other data.

Figure 6:
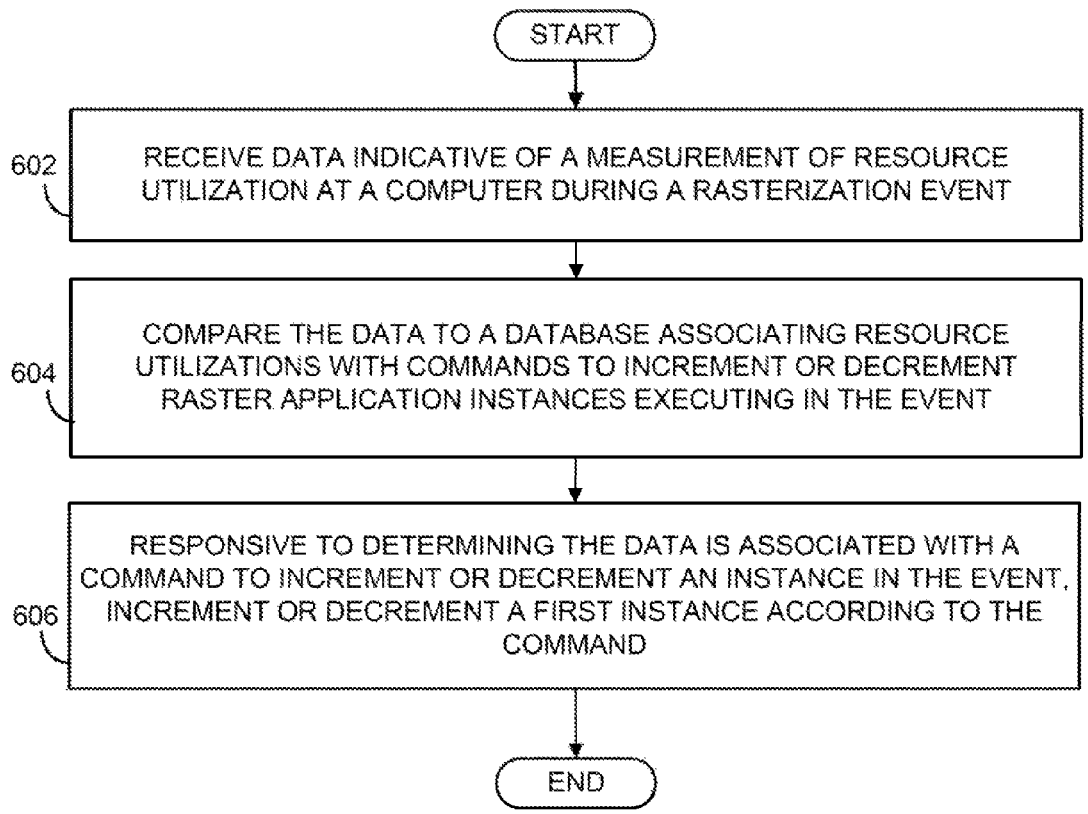
FIG. 6 is a flow diagram depicting steps taken to implement various embodiments.

FIG. 6 is a flow diagram of operation in a system according to various embodiments. In discussing FIG. 6, reference may be made to the diagrams of FIGS. 1, 3 and 5 to provide contextual examples. Implementation, however, is not limited to those examples. Starting with FIG. 6, data is received that is indicative of a measurement of resource utilization at a computer during a rasterization event (block 602). Referring back to FIGS. 1, 3, and 5, measurement data module 122, 322, or 522 may be responsible for implementing block 602.

Continuing with FIG. 6, the data is compared to a database associating resource utilizations with commands to increment or decrement raster application instances executing in the event (block 604). Referring back to FIGS. 1, 3, and 5, comparison module 124 or 524, or comparison module two 324, may be responsible for implementing block 604.

Continuing with FIG. 6, responsive to determining the data is associated with a command to increment or decrement an instance in the event, a first instance is incremented or decremented according to the command (block 606). Referring back to FIGS. 1, 3, and 5, instance change module 126, 326, or 526 may be responsible for implementing block 606.

Figure 7:
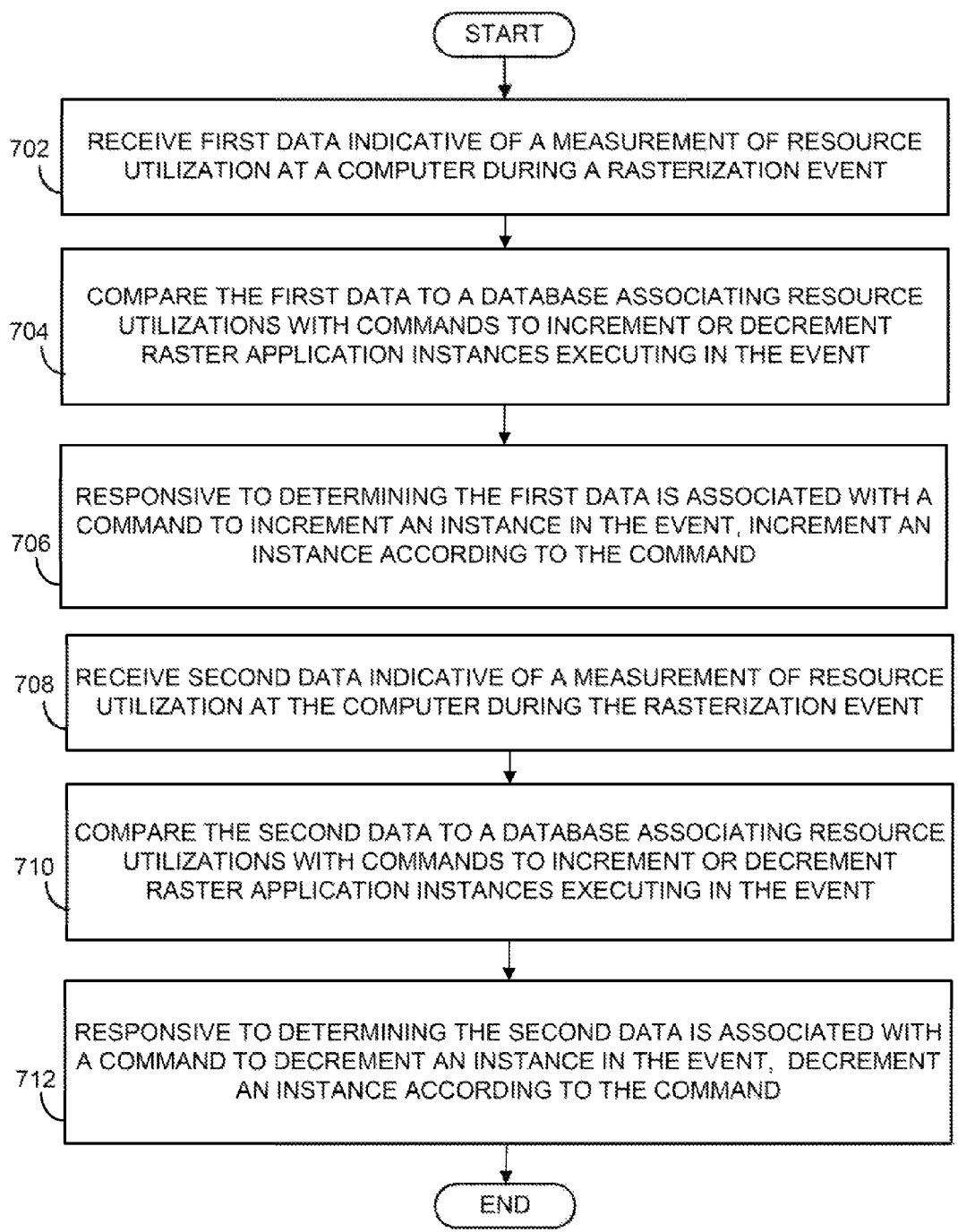
FIG. 7 is a flow diagram depicting steps taken to implement various embodiments.

FIG. 7 is a flow diagram of operation in a system according to various embodiments. In discussing FIG. 7, reference may be made to the diagrams of FIGS. 1, 3 and 5 to provide contextual examples. Implementation, however, is not limited to those examples. Starting with FIG. 7, first data is received that is indicative of a measurement of resource utilization at a computer during a rasterization event (block 702). Referring back to FIGS. 1, 3, and 5, measurement data module 122, 322, or 522 may be responsible for implementing block 702.

Continuing with FIG. 7, the first data is compared to a database associating resource utilizations with commands to increment or decrement raster application instances executing in the event (block 704). Referring back to FIGS. 1, 3, and 5, comparison module 124 or 524, or comparison module two 324, may be responsible for implementing block 704.

Continuing with FIG. 7, responsive to determining the first data is associated with a command to increment an instance in the event, an instance is incremented according to the command (block 706). Referring back to FIGS. 1, 3, and 5, instance change module 126, 326, or 526 may be responsible for implementing block 706.

Continuing with FIG. 7, second data is received that is indicative of a measurement of resource utilization at the computer during the rasterization event (block 708). Referring back to FIGS. 1, 3, and 5, measurement data module 122, 322, or 522 may be responsible for implementing block 708.

Continuing with FIG. 7, the second data is compared to a database associating resource utilizations with commands to increment or decrement raster application instances executing in the event (block 710). Referring back to FIGS. 1, 3, and 5, comparison module 124 or 524, or comparison module two 324, may be responsible for implementing block 710.

Continuing with FIG. 7, responsive to determining the second data is associated with a command to decrement an instance in the event, an instance is decremented according to the command (block 712). Referring back to FIGS. 1, 3, and 5, instance change module 126, 326, or 526 may be responsible for implementing block 712.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium containing instructions, the instructions when executed by a processor to cause the processor to:
   receive data indicative of a measurement of resource utilization at a computer during a rasterization event;
   compare the data to a database associating resource utilizations with commands to increment or decrement raster application instances executing in the event; and
   responsive to determining the data is associated with a command to increment or decrement an instance in the event, increment or decrement a first instance according to the command.

2. The medium of claim 1, wherein the database includes a trigger utilization level associated with a command to increment an instance to the event, and a ceiling utilization level associated with a command to decrement an instance from the event.

3. The medium of claim 1,
   wherein the data is third data, and wherein the instructions cause the processor to receive first data indicative of a quantity of raster application instances available to be executed concurrently at the computer during the event;
   receive second data indicative of a quantity of instances concurrently executing at the computer during the event; and
   prior to incrementing the first instance, compare the first and second data to determine the quantity of instances available is greater than the quantity of instances concurrently executing.

4. The medium of claim 1,
   wherein the raster application instances are dynamic application instances, and
   wherein a quantity of static raster application instances execute at the computer concurrent with the first instance during the event.

5. The medium of claim 1, wherein the measurement is a measurement of processor utilization.

6. The medium of claim 1, wherein the measurement is a measurement of memory utilization.

7. The medium of claim 1, wherein the measurement is a measurement of multithread utilization.

8. The medium of claim 1, wherein the measurement is a measurement of network bandwidth utilization.

9. The medium of claim 1, wherein the instructions cause the processor to cause rasterization of a print job utilizing the first instance.

10. The medium of claim 9, wherein the instructions cause the processor to cause printing of the print job.

11. A system, comprising:
    a measurement data module implemented at least in hardware, configured to receive data indicative of a measurement of resource utilization at a computer during a rasterization event;
    a first comparison module implemented at least in hardware, configured to compare the data to a database associating resource utilizations with commands to increment or decrement raster application instances executing in the event; and
    an instance change module implemented at least in hardware, configured to responsive to determining the data is associated with a command to increment or decrement an instance in the event, increment or decrement a first instance according to the command.

12. The system of claim 11, wherein the database includes a trigger utilization level associated with a command to increment an instance to the event, and a ceiling utilization level associated with a command to decrement an instance from the event.

13. The system of claim 11, wherein the data is third data, and further comprising:
- an availability data module, configured to receive first data indicative of a number of raster application instances available to be executed concurrently at the computer during the event;
- a usage data module, configured to receive second data indicative of a number of instances concurrently executing at the computer during the event; and
- a second comparison module, configured to, prior to incrementing an instance, compare the first and second data to determine the number of instances available is greater than the number of instances concurrently executing.

14. The system of claim 11,
- wherein the raster application instances are dynamic application instances, and
- wherein a number of static raster application instances execute at the computer concurrent with the first instance during the event.

15. The system of claim 11, wherein the measurement is a ratio of free processing capability relative to available processing capability, or a ratio of utilized processing capability relative to available processing capability.

16. The system of claim 11, wherein the measurement is a ratio of free memory relative to available memory, or a ratio of utilized memory relative to available memory.

17. The system of claim 11, wherein the measurement is a ratio of free threads relative to available threads, or a ratio of utilized threads relative to available threads.

18. The system of claim 11, wherein the measurement is a ratio of free network bandwidth relative to available network bandwidth, or a ratio of utilized network bandwidth relative to available network bandwidth.

19. A non-transitory computer-readable storage medium containing instructions, the instructions when executed by a processor to cause the processor to:
- receive first data indicative of a number of raster application instances available to be executed concurrently at a computer during a rasterization event;
- receive second data indicative of a number of instances concurrently executing at the computer during the event;
- compare the first and second data to determine the number of instances available is greater than the number of instances concurrently executing;
- receive third data indicative of a measurement of resource utilization at a computer during a rasterization event;
- compare the third data to a trigger utilization level associated with a command to increment an instance to the event; and
- responsive to determining the third data is indicative of a utilization level above the trigger level, increment a first instance to the event.

20. The medium of claim 19, wherein the instructions cause the processor to:
- receive fourth data indicative of a measurement of resource utilization at a computer during a rasterization event;
- compare the fourth data to a ceiling utilization level associated with a command to decrement an instance from the event;
- responsive to determining the fourth data is indicative of a utilization level above the ceiling level, decrement an instance from the event.

* * * * *